Nov. 6, 1962     W. H. PERCIVAL     3,062,510
HEAT STORAGE DEVICE
Filed April 16, 1959
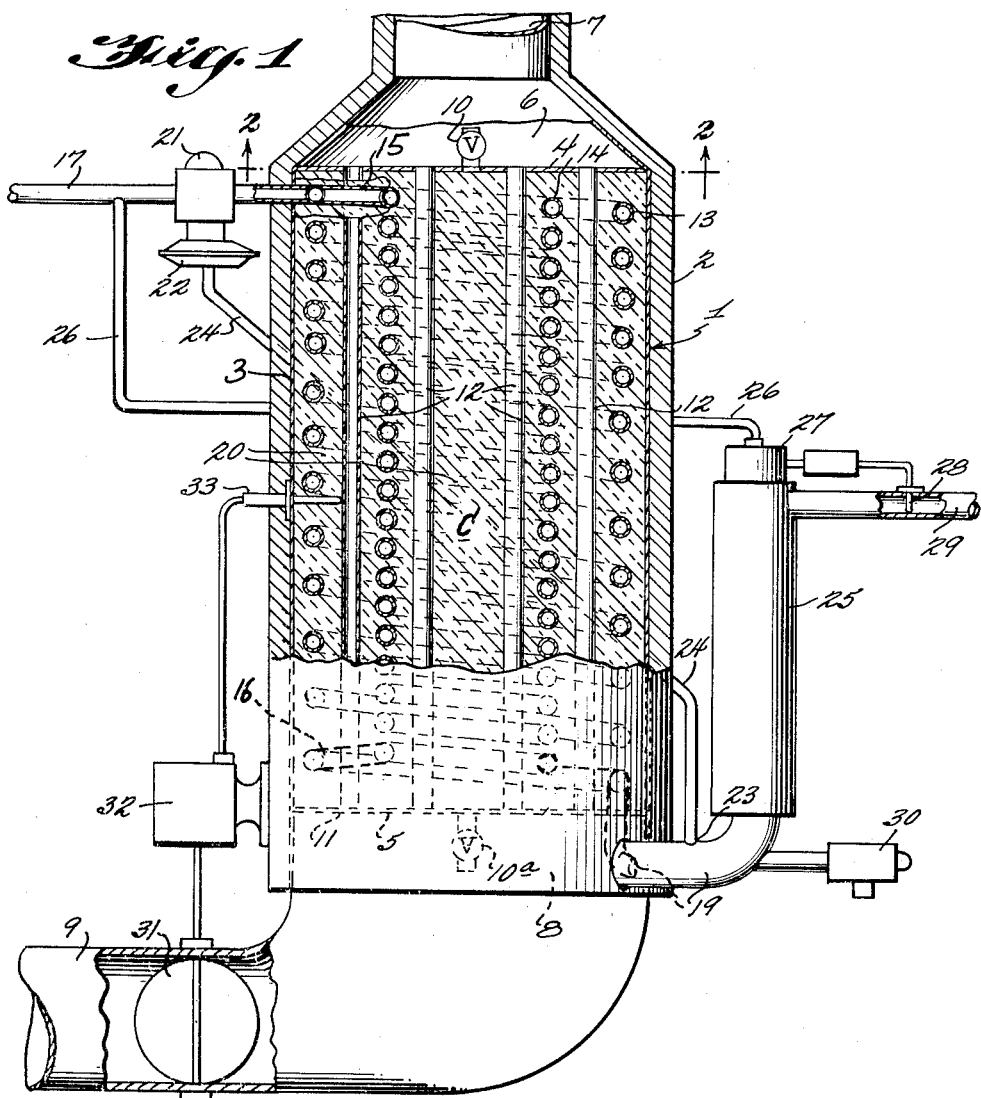
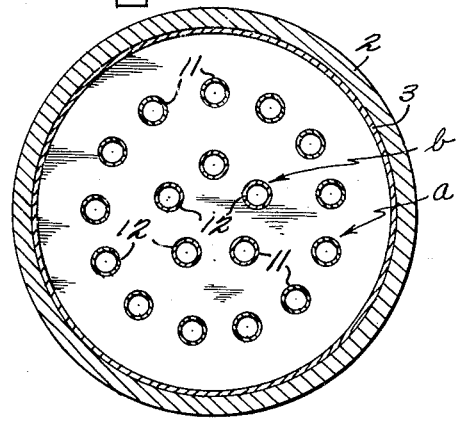
INVENTOR
WORTH H. PERCIVAL
BY    *G. L. De Mott*
ATTORNEY

United States Patent Office 3,062,510
Patented Nov. 6, 1962

3,062,510
HEAT STORAGE DEVICE
Worth H. Percival, St. Clair Shores, Mich., assignor to General Motors Corporation, Detroit, Mich., a corporation of Delaware
Filed Apr. 16, 1959, Ser. No. 806,944
1 Claim. (Cl. 257—313)

The present invention relates generally to a heat storage and exchange device for heating a fluid medium conducted in heat exchange relation through the heat storage portion of the device and more particularly relates to the heat absorbing material and the controls employed in such a device. The heat storage and exchange device may be used for various purposes, for instance, for producing steam for driving a steam turbine.

It is an object of the invention to provide a heat storage and exchange device which has a high thermal efficiency.

Another object is to provide a filler or heat absorbing material within the heat storage device which has a high specific heat, high heat of fusion at an elevated working temperature, good thermal conductivity, negligible vapor pressure at maximum operating temperature and high density.

Another object is to provide means for preventing oxidation of the filler material within the vessel.

Still another object is to provide a reliable control of the hot gas admitted to the heat storage device and another control for regulating the admission of the fluid medium to be heated.

The invention is diagrammatically illustrated by way of example in the accompanying drawing wherein:

FIG. 1 is an elevational view, partly in cross-section, of a preferred form of the heat storage and exchange device according to my invention; and FIG. 2 is a plan view along line 2—2 of FIG. 1.

The heat storage and exchange apparatus or device shown in the drawing comprises a container or vessel of any suitable material such as steel and generally indicated by the numeral 1. The vessel 1 is covered externally with heat insulating material 2, which in turn may be enveloped by a sheet metal shell (not shown). If desired, the heat insulating material 2 may be freely applied to the exterior of the vesel. Vessel 1 may be of any desired shape. Preferably, it is cylindrical and composed of a cylindrical side wall 3 and upper and lower end walls 4 and 5, respectively. The upper portion of side wall 3 beyond end wall 5 forms a frusto-conical gas chamber 6 continuing into an outlet pipe 7. The lower portion of sidewall 3 below end wall 5 forms another gas chamber 8 to which the gas inlet pipe 9 is connected. Walls 3, 4 and 5 are welded or riveted together and form a closed compartment C which is airtight and hermetically sealed. It may be closed by a valve 10 made of heat resistant material. Valve 10 is disposed, for example, in gas chamber 6. As an alternative, it could be disposed on side wall 3. Upper and lower end walls 4, 5, respectively, are provided with a plurality of circular apertures 11 in which cylindrical flue tubes 12 are secured. The flue tubes 12 constitute heat conducting or heat transfer elements and extend through the compartment C defined by walls 3, 4 and 5. Also arranged in the interior of the compartment C are two pairs of coiled tubes or ducts 13 and 14. Tubes 13 and 14 are coiled around imaginary cylinders of different diameter within the compartment. Tubular duct 13 is coiled around an imaginary cylinder of relatively large diameter adjacent sidewall 3, whereas tubular duct 14 is coiled around an imaginary cylinder of relatively small diameter and closer to the axis of the compartment C. As can be seen from the drawing in FIG. 2, the flue tubes 12 form two spaced circular rows $a$ and $b$. Tubular duct 13 is disposed between row $a$ and side wall 3, and tubular duct 14 is disposed between the two rows $a$ and $b$ of the flue tubes. Tubular ducts 13 and 14 conduct the fluid medium to be heated in the heat storage and exchange device and are made of suitable steel pipes or pipes of allow steel or stainless steel having a high specific heat.

The coiled tubes 13 and 14 are interconnected at their upper ends by a short tube 15 providing for parallel flow of the fluid medium through the coils. At their lower ends the coiled tubes 13 and 14 are interconnected by another short tube 16. The inflow pipe 17 connects the coiled tubes 13 and 14 to a supply of fluid medium, for instance, water of ambient temperature. Instead of water, any other liquid or other gases to be heated may be supplied through pipe 17. For instance, a supply pump may be used to pump the fluid medium to be heated to the heat storage and exchange device. The exit or outflow from coiled tubes 13 and 14 is through insulated pipe 19. A heat absorbent material 20, shown in FIG. 1 in dotted cross-hatching, surrounds the flue tubes 12 and coiled tubes 13 and 14 within the compartment C.

The gas inlet pipe 9 is supplied with hot gas from a gas generator (not shown) or from any other suitable source, for instance, exhaust gas from an internal combustion engine (not shown). The hot gas enters the inlet chambers 8, flows through the flue tubes or heat transfer elements 12 and transfers heat to the heat absorbing material 20 which stores the heat and transfers it to the fluid medium flowing through coiled tubes 13 and 14, respectively. The used gas collects in outlet chamber 6 and exits through outlet pipe 7. Tubes 13 and 14 may be provided with fins (not shown) to improve heat transfer.

The fluid to be heated, which in most cases is water, is regulated by a suitable valve 21 in the inflow pipe 17. Valve 21 is actuated by a servo motor 22 controlled by the pressure of the heated fluid medium. Pressure is taken off at point 23 of outflow portion 19 and conducted through an auxiliary pipe line 24 to valve servo motor 22. If the fluid medium is water, superheated steam exists in outflow pipe 19. Pipe 19 continues into a desuperheater device 25. This device may be a commercial type or a type redesigned for the heat storage device according to the invention. The desuperheater device functions to mix cold water, or other cold fluid medium from pipe 26, with the hot superheated fluid medium (steam) if the temperature in the pipe 19 is higher than normal. Pipe 26 is branched off inlet pipe 17. The flow of cold fluid medium through pipe 26 is regulated by a temperature actuated valve 27 from a temperature sensitive device 28 in exit pipe 29 of the desuperheater 25. A safety valve 30 connected to pipe 19 functions if the pressure in pipe 19 should rise above a predetermined level.

Admission of hot gas entering pipe 9 is regulated by a butterfly valve 31 controlled by a temperature actuated servo device 32 from a temperature sensitive device or bulb 33 embedded in the heat absorbing material 20. Temperature sensitive bulb 33 is conducted through side wall 3 of the vessel 1 and lies between two coils of duct 13.

The heat absorbing filler material 20 is one having a high specific heat, high heat of fusion at an elevated working temperature, good thermal conductivity, negligible vapor pressure at maximum operating temperature, high density, and preferably non-corrosiveness at operating temperature. I propose to use alternatively five filler materials, namely, lithium, berryllium, boron, boron carbide and graphite, which satisfy the aforesaid specifications. Lithium has a melting temperature of 367° F. and is used during operation of the heat storage and exchange device as liquid lithium. The inside of compartment C is then coated with molybdenum, chromium or another suitable coating to prevent attack and corrosion by the liquid lithium. The other four materials are used in granulated or powdered form. In the claims the term "powdered" is used, and it is intended that this term include the granulated form.

The compartment C is airtight, so that no oxidation of the filler material can take place. The filler material can be admitted to the compartment C in any suitable way, for instance, through valve 10 when the interior of the compartment is under vacuum. Vacuum may be applied through a valve 10a of heat resistant material in end wall 5. When the compartment is filled or before filling, a non-oxidizing gas such as nitrogen or helium is preferably admitted before sealing the compartment. The final sealing of the compartment should be done at a temperature near the maximum operating temperature of the heat storage device in order to avoid expansion problems of the heat absorbing material 20.

The total stored heat of the apparatus is that of the heat absorbing material 20 plus that of the metal of the flue tubes 12 and the fluid medium conducting tubes 13 and 14, although the metal storage of the tubes is only a small fraction of the total. The maximum operating temperature of the apparatus lies preferably in the range of 1400–1600° F.

What is claimed is:

A heat storage and exchange device comprising a thermally insulated metal vessel having a closed compartment therein, an inlet for hot gas and an outlet for hot gas at opposite ends of said vessel, said compartment being disposed between said inlet and said outlet, a plurality of flue tubes for said hot gas between said inlet and outlet extending through said compartment, tubular ducts within said compartment for conducting water to be heated into steam, said tubular ducts having an inflow portion outside said vessel and an outflow portion also outside said vessel, heat absorbing material disposed within said compartment about said flue tubes and tubular ducts, said compartment having a non-oxidizing gas therein enveloping said heat absorbing material, a first valve controlling said hot gas inlet, a second valve controlling said inflow portion of said tubular ducts, a temperature sensitive device embedded in said heat absorbing material for regulating said first valve, servo motor means controlled by the pressure in the outflow portion of said tubular ducts for regulating said second valve, a desuperheater device having an inlet and an outlet in said outflow portion arranged in series with said outflow portion, conduit means connecting said desuperheater device and said inflow portion to supply water to said desuperheater and temperature control means sensitive to the temperature in the desuperheater outlet to control the inflow of water from said conduit means to said desuperheater.

References Cited in the file of this patent

UNITED STATES PATENTS

| 695,041 | Fues | Mar. 11, 1902 |
| 1,415,952 | Rogillio | May 16, 1922 |
| 1,647,647 | McKay et al. | Nov. 1, 1927 |
| 1,870,809 | Handy | Aug. 9, 1932 |
| 2,526,898 | Powell et al. | Oct. 24, 1950 |

FOREIGN PATENTS

| 60,454 | Switzerland | Mar. 13, 1912 |